United States Patent [19]

Busche

[11] Patent Number: 4,666,118
[45] Date of Patent: May 19, 1987

[54] TRAY ASSEMBLY

[76] Inventor: Thomas F. Busche, 5789 Western View Pl., Mt. Airy, Md. 21771

[21] Appl. No.: 818,341

[22] Filed: Jan. 13, 1986

[51] Int. Cl.$^4$ .............................................. A47F 5/00
[52] U.S. Cl. .............................. 248/288.5; 248/181; 248/218.4; 248/231.5; 248/231.6; 108/6
[58] Field of Search .................. 248/181, 288.3, 288.5, 248/231.5, 231.6, 218.4, 309.1, 311.2; 108/6, 8; 297/161

[56] References Cited

U.S. PATENT DOCUMENTS

| 86,173 | 1/1869 | Maynard | 248/288.3 |
|---|---|---|---|
| 508,319 | 11/1893 | Ivarson | 248/181 |
| 1,395,490 | 11/1921 | Graff | 248/288.3 |
| 1,455,784 | 5/1923 | Godley | 248/288.3 |
| 1,465,213 | 8/1923 | Feinberg | 248/231.5 |
| 1,872,491 | 8/1932 | Noetzel | 248/231.5 |
| 2,510,436 | 6/1950 | Trammell | 248/181 |
| 2,950,836 | 8/1960 | Murdock | 248/181 |
| 3,944,178 | 3/1976 | Greenwood | 248/231.6 |
| 4,516,751 | 5/1985 | Westbrook | 248/181 |
| 4,519,512 | 5/1985 | Frazier | 248/231.6 |

FOREIGN PATENT DOCUMENTS 620599  3/1949  United Kingdom ............... 248/103

Primary Examiner—Reinaldo P. Machado
Assistant Examiner—Alvin Chin-Shue
Attorney, Agent, or Firm—John J. Byrne

[57] ABSTRACT

A portable tray assembly which is particularly adapted for use with furniture that is to be used on irregular surfaces. The assembly can be secured to the leg of the furniture at a selected radial position, the tray portion rotated to a selected position, leveled by way of a swivel joint, and secured by way of nut and screw locking means.

7 Claims, 8 Drawing Figures

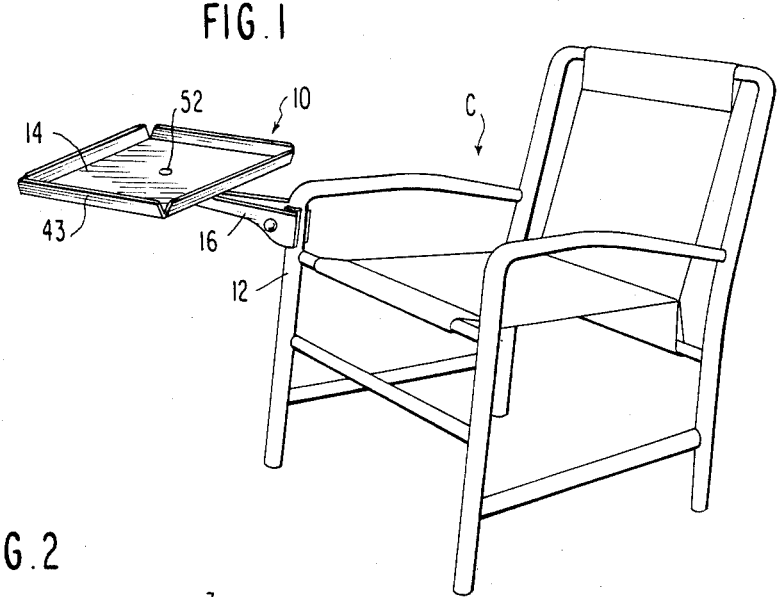
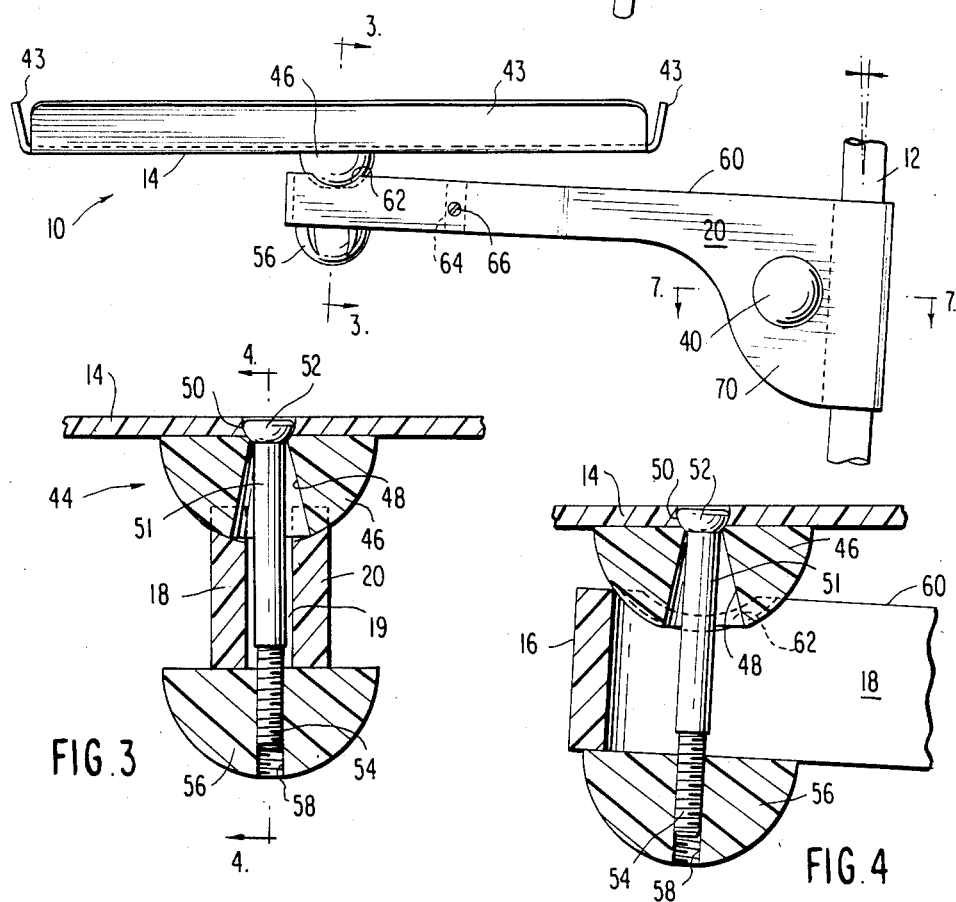

TRAY ASSEMBLY

BACKGROUND OF THE INVENTION

This invention relates to a tray assembly that can be affixed to an item of furniture such that the tray can be leveled and positioned at a selected angle with respect to the furniture.

SUMMARY AND OBJECTIVES

A principal objective of this invention is to provide a tray assembly which can be secured to a piece of furniture and its spatial attitude selected and fixed notwithstanding the fact that the furniture is supported on an uneven surface.

Another objective of this invention is to provide a universal joint for supporting a tray at the end of a cantilever arm assembly which is sturdy in construction and foolproof in operation.

Another objective of this invention is to provide a lightweight assembly that can accomplish the above objectives, is easy to manufacture, is attractive in appearance, and is adapted to withstand the outdoor environment in which it will be most commonly used.

These and other objects of this invention will become more apparent to those skilled in the art by reference to the following detailed description when viewed in light of the accompanying drawings.

BRIEF DESCRIPTION OF DRAWINGS

FIG 1 is perspective view of the server attached to the leg of a chair.

FIG. 2 is a side elevation view of the server.

FIG. 3 is a cross-sectional view of a universal joint taken along the line 3—3 of FIG. 2.

FIG. 4 is a cross-sectional view of the universal joint taken along the line 4—4 of FIG. 3.

DESCRIPTION OF THE PREFERRED EMBODIMENT

Figure 5:
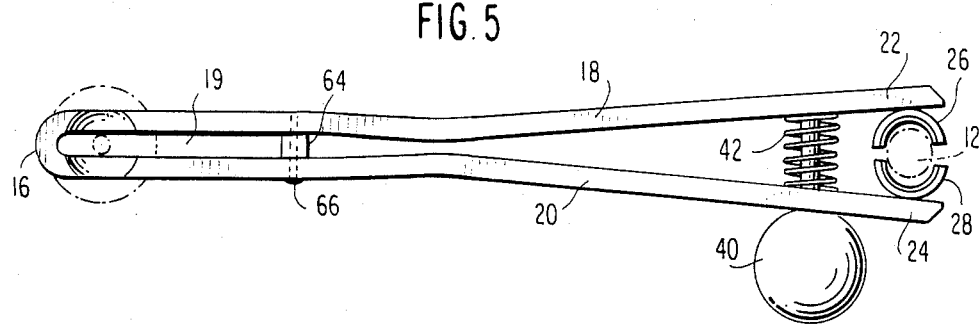
FIG. 5 is a plan view of the supporting arm below the serving tray.

Referring now to the drawings wherein like numerals indicate like parts, the server assembly of this invention is generally indicated by the numeral 10. As shown in FIG. 1, the assembly is affixed to the leg 12 of the chair C. The leg 12 could just as well be the leg of a table or other piece of furniture that has a generally vertical member.

The principal support for a serving tray 14 is an arm 16 comprised of a pair of elongated arm members 18 and 20 which are generally parallel to each other for a portion of their length and then flare outwardly to inner ends 22 and 24 to which grips 26 and 28 are respectively secured. The grips 26 and 28 are in opposed relationship with one another and provide a space in which the leg 12 can be grasped.

A lock assembly 30 to lockingly engage assembly 10 to leg 12 includes a screw 32 having a threaded end 34 and a headed end 36. Head 36 is hemispherical and is received by a mating hemispherical concave depression 38. The threaded end 34 is received by a threaded nut 40. Nut 40 is a spherical plastic member which provides a pleasing appearance and is of a nonsnagging material such as lucite. A coil spring 42 is disposed about the screw 32 between the arms 18 and 20. As can be seen, the grips 26 and 28 are drawn together or moved apart under the influence of the thread action between the threaded portion 34 and the nut 40. As the nut 40 is screwed outwardly, grips 26 and 28 move apart automatically through the action of spring 42.

The tray or planar server 14 has its center disposed over the outer end of arm 16. The tray is secured to the arm 16 by way of a universal assembly or swivel joint generally referred to by the numeral 44.

Figure 6:
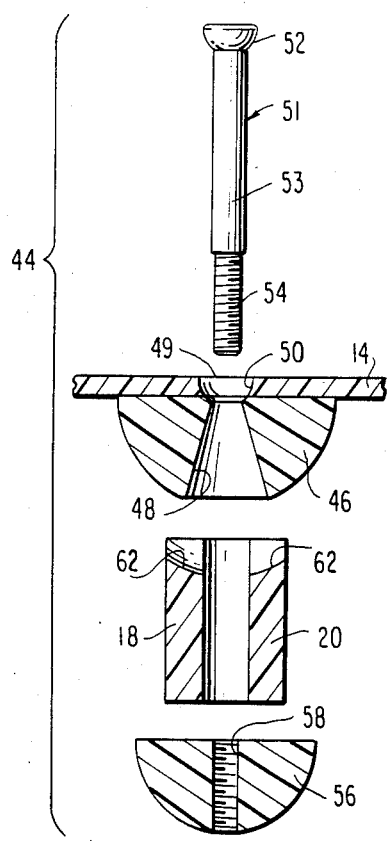
FIG. 6 is an exploded view of the universal joint.
Figure 7:
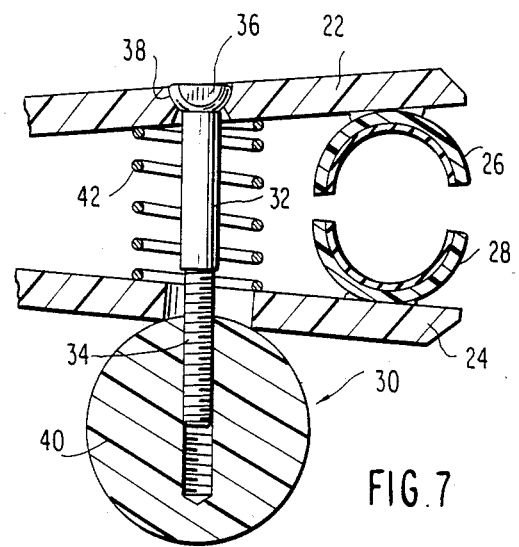
FIG. 7 is a cross-sectional view along the line 7—7 of FIG. 2.
Figure 8:
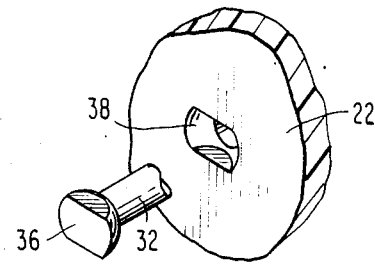
FIG. 8 is a partial perspective view of a portion of the assembly.

A hemispheric member 46 has its flat surface secured to the bottom surface of tray 42 by way of an adhesive or the like. The hemispheric member has a tapered opening 48 therethrough that flares outwardly from top to bottom. At its upper end, the opening 46 is communicated with an aperture 49 formed in the center of the tray 42. The aperture 49 is formed with a concave surface 50 best seen in FIG. 6. The opening 46 receives a screw 51 having a head 52 and a stem 53. Stem 53 extends through the opening 46 through the space 19 between arms 18 and 20 and terminates in a threaded portion 54 threadably received by a nut member 56 having a threaded opening 58. It should be noted that the flared opening 48 will permit a rather sizeable tilting of tray 14 without interfering with the function of the universal joint surfaces.

The upper surfaces 60 of the arms 18 and 20 are formed with a depression 62 receiving the outer surface of hemispheric member 46. Intermediate the length of arms 18 and 20 a reinforcing spacer 64 is secured by a screw 66. The arms 18 and 20 are widened at their inner ends 70 and 72 to provide greater strength and to provide ample room for the grips 26 and 28 and the securing assembly 30.

The tray 42 is formed with upwardly extending flanges 43 as a safety precaution for items placed thereon.

In operation, the tray assembly is initially fixed to the leg 12. This, of course, is done by loosening the nut 40 until the grips 26 and 28 are sufficiently spread so that they can be placed on either side of leg 12. The nut 40 is then rotated until the assembly is affixed to the leg. The radial disposition of the arm 16 with respect to the axis of leg 12 is selected prior to tightening nut 40 completely. As nut 40 is tightened, there is an inward movement of the inner ends 70 and 72. The reinforcing spacer 64 isolates the stress in members 18 and 20 from the flared ends of the arm. The radial disposition of the arm 16 with respect to the leg 12 is selected while the grips are in loose contact with the leg. Then the nut 40 is tightened.

The rectangular depression 38 which receives this generally rectangular head 36 is unaffected by the fact that as the arms 18 and 20 are drawn together. No unusual stresses will develop even though the angular disposition of the flared ends 70 and 72 will change as the nut 40 is released or tightened. Likewise, it should be noted that the spacer 64 substantially isolates any deformations in the ends 70 and 72 from the distal ends of the arm.

When the leg 12 is at an angle deviating from the vertical, the tray 42 is tilted or swivelled to a level position. The spherical interengagement of recess or depression 62 with the exterior of hemispherical member 45 readily permits this. After the tray is level, it can be rotated to a selected position with respect to the chair. The nut 56 is then tightened until the members are securely fastened by friction.

It has been found that a plastic such as lucite is of particular desirability for the arm members, universal joint, and the locking assembly 40

While the present invention has been illustrated by a detailed description of the preferred embodiment thereof, it will be obvious to those skilled in the art that various changes in form and detail can be made therein without departing from the true scope of the invention. For that reason, the invention must be measured by the claims appended thereto, and not by the foregoing embodiments.

I claim:

1. A portable support assembly for attachment to a base member comprising:
   an elongated arm structure having first and second ends;
   attachment menas for removably securing said first end of said arm to said base memeber at a selected radial disposition;
   a generally flat support structure formed with a through aperture having a taperedly curved concave shape such that a first opening is located on a surface of said generally flat support structure and a second smaller opening is located on an opposing surface of said generally flat support structure;
   a hemispheric member having its major flat cross section adjoiningly fixed to a surface of said tray including said smaller opening and also covering said smaller opening;
      said hemispheric member having a tapered bore therethrough flaring outwardly from said second smaller opening of said tray,
      said hemispherical member being pivotably rested on an correspondingly curved end portion of said arm opposing said end attached to said base member,
   a fastener means for securing said joined generally flat support structure and hemispherical member to said curved end portion of said arm, inserted through said through aperture of said generally flat support structure and through said bore of said hemispherical member, having a head disposed at least partially within said through aperture of said generally flat support structure;
      said head of said fastener means being of a taperedly curved concave shape and size corresponding to and in immediate abuttment to the taperedly curved concave surface of said tray aperture,
   whereby said generally flat support structure is operative to pivotally rotate about said head, in full three dimensions including all planes to which a major axis of said fastener means is parallel, while said head remaining at all times in guiding contact with said tray, as said hemispherical member pivotally rotate about said curved end portion of said arm also in full three dimensions.

2. An assembly as recited in claim 1, wherein:
   said arm comprising first and second elongated members having a space therebetween; and
   said first and second member each having a correspondingly taperedly curved concave end portion for jointly supporting said hemispherical member.

3. The assembly as recited in claim 1 wherein:
   said arm comprising first and second elongated members having a space therebetween;
   said attachment means comprising;
      a first grip on said first member,
      a second grip on said second member in opposed relationship to said first grip,
      means connecting a portion of said first member and a corresponding portion of said second member, for selectively causing said connected portions of said first and second member to converge and to diverge;
      whereby when said connected portions of said first and second members are made to converge by said causing means, said first and second grips are loosened about said base member, and when said connected portions of said first and second members are made to diverge by said causing means, said first and second grips are tightened about said base member.

4. An assembly as recited in claim 3, wherein said selective causing means comprising:
   a screw disposed in a mid-portion of said first and second member and connecting said first and second member;
   a spring axially disposed about said screw and between said first and second member; and
   a nut threadably mounted about said screw on an opposing side of said second member, relative to said spring;
   whereby tightening action of said nut and screw loosens said first and second grip about said base member, and releasing action of said nut and screw tightens said first and second grip about said base member.

5. An assembly as recited in claim 4, wherein:
   said screw is inserted through a through aperture in each of said first and second member in making said connection therebetween;
   said through aperture in said first member having a tapered concave surface;
   said screw having a head, and said head being of a curved shape and size corresponding to and also disposed within and in immediate abuttment to the tapered concave surface of said through aperture of said first member; and
   whereby as said connected portions of said first and second member are made to converge and to diverge, said first member is operative to rotate about said head while remaining in guiding contact therewith.

6. The assembly of claim 3 wherein said first and second elongated members are reinforced by a spacer in said space intermediate the lengths of said arms.

7. The assembly of claim 3 wherein said first and second elongated members are joined at their distal ends.

* * * * *